CIRCUIT ARRANGEMENT FOR CONVERTING AN ANALOG SIGNAL INTO A PULSE SEQUENCE MODULATED IN NUMBER

Filed Dec. 8, 1964 6 Sheets-Sheet 1

INVENTORS
CORNELIS H. LOOS &
JOHANNES B.H. PEEK
BY
Frank R. Trifari
AGENT

| k | $a_1$ | $a_2$ | $a_3$ | $a_4$ | $a_5$ | $a_6$ | $a_7$ | $a_8$ |
|---|---|---|---|---|---|---|---|---|
| $^1/_{16}$= 0,0625 | 0,20 | 0,19 | 0,18 | 0,18 | 0,17 | 0,15 | 0,14 | 0,13 |
| $^2/_{16}$= 0,1250 | 0,38 | 0,35 | 0,31 | 0,25 | 0,18 | 0,12 | 0,05 | 0,00 |
| $^3/_{16}$= 0,1875 | 0,56 | 0,46 | 0,33 | 0,18 | 0,04 | 0,06 | 0,12 | 0,13 |
| $^4/_{16}$= 0,2500 | 0,71 | 0,50 | 0,24 | 0,00 | 0,14 | 0,17 | 0,10 | 0,00 |
| $^5/_{16}$= 0,3125 | 0,83 | 0,46 | 0,07 | 0,18 | 0,20 | 0,06 | 0,08 | 0,13 |
| $^6/_{16}$= 0,3750 | 0,92 | 0,35 | 0,13 | 0,25 | 0,08 | 0,12 | 0,13 | 0,00 |
| $^7/_{16}$= 0,4375 | 0,98 | 0,19 | 0,28 | 0,18 | 0,11 | 0,15 | 0,03 | 0,13 |
| $^8/_{16}$= 0,5000 | 1,00 | 0,00 | 0,33 | 0,00 | 0,20 | 0,00 | 0,14 | 0,00 |

INVENTORS
CORNELIS H. LOOS &
JOHANNES B.H. PEEK
BY
Frank R. Trifari
AGENT

CIRCUIT ARRANGEMENT FOR CONVERTING AN ANALOG SIGNAL
INTO A PULSE SEQUENCE MODULATED IN NUMBER

Filed Dec. 8, 1964 6 Sheets-Sheet 3

INVENTORS
CORNELIS H. LOOS &
JOHANNES B.H. PEEK
BY
Frank R. Trifari
AGENT

| | I  | II  |
|---|---|---|
| 1/8 T | 0 1 0 1 0 1 0 1 0 1 0 1 0 1 0 1 | 0 8 0 8 0 8 0 8 0 8 0 8 0 8 0 8 |
| 1/4 T | 0 0 2 2 0 0 2 2 0 0 2 2 0 0 2 2 | 0 0 4 4 0 0 4 4 0 0 4 4 0 0 4 4 |
| 1/2 T | 0 0 0 0 4 4 4 4 0 0 0 0 4 4 4 4 | 0 0 0 0 2 2 2 2 0 0 0 0 2 2 2 2 |
| T | 0 0 0 0 0 0 0 0 8 8 8 8 8 8 8 8 | 0 0 0 0 0 0 0 0 1 1 1 1 1 1 1 1 |
| | 0 1 2 3 4 5 6 7 8 9 10 11 12 13 14 15 | 0 8 4 12 2 10 6 14 1 9 5 13 3 11 7 15 |
| 1/30 = 0,03333 ~ 0,5 | 0 0 0 0 0 0 0 0 0 0 0 0 0 0 0 1 | 0 0 0 0 0 0 0 0 0 0 0 0 0 0 0 1 |
| 3/30 = 0,1 ~ 1,5 | 0 0 0 0 0 0 0 0 0 0 0 0 0 0 1 1 | 0 0 0 0 0 0 0 1 0 0 0 0 0 0 0 1 |
| 5/30 = 0 16667 ~ 2,5 | 0 0 0 0 0 0 0 0 0 0 0 0 0 1 1 1 | 0 0 0 0 0 0 0 1 0 0 0 1 0 0 0 1 |
| 7/30 = 0,23333 ~ 3,5 | 0 0 0 0 0 0 0 0 0 0 0 0 1 1 1 1 | 0 0 0 1 0 0 0 1 0 0 0 1 0 0 0 1 |
| 9/30 = 0,3 ~ 4,5 | 0 0 0 0 0 0 0 0 0 0 0 1 1 1 1 1 | 0 0 0 1 0 0 0 1 0 0 0 1 0 1 0 1 |
| 11/30 = 0,36667 ~ 5,5 | 0 0 0 0 0 0 0 0 0 0 1 1 1 1 1 1 | 0 0 0 1 0 1 0 1 0 0 0 1 0 1 0 1 |
| 13/30 = 0,43333 ~ 6,5 | 0 0 0 0 0 0 0 0 0 1 1 1 1 1 1 1 | 0 0 0 1 0 1 0 1 0 1 0 1 0 1 0 1 |
| 15/30 = 0,5 ~ 7,5 | 0 0 0 0 0 0 0 0 1 1 1 1 1 1 1 1 | 0 1 0 1 0 1 0 1 0 1 0 1 0 1 0 1 |

INVENTORS
CORNELIS H. LOOS &
JOHANNES B. H. PEEK
BY
Frank R. Trifari
AGENT

| | K | T | T/2 | T/3 | T/4 | T/5 | T/6 | T/7 | T/8 |
|---|---|---|---|---|---|---|---|---|---|
| I | 1/30 = 0,03333 ∼0,5 | 0,20 | 0,19 | 0,18 | 0,18 | 0,17 | 0,15 | 0,14 | 0,13 |
| | 3/30 = 0,1 ∼1,5 | 0,38 | 0,35 | 0,31 | 0,25 | 0,18 | 0,12 | 0,05 | 0,00 |
| | 5/30 = 0,16667 ∼2,5 | 0,56 | 0,46 | 0,33 | 0,18 | 0,04 | 0,06 | 0,12 | 0,13 |
| | 7/30 = 0,23333 ∼3,5 | 0,71 | 0,50 | 0,24 | 0,00 | 0,14 | 0,17 | 0,10 | 0,00 |
| | 9/30 = 0,3 ∼4,5 | 0,83 | 0,46 | 0,07 | 0,18 | 0,20 | 0,06 | 0,08 | 0,13 |
| | 11/30 = 0,36667 ∼5,5 | 0,92 | 0,35 | 0,13 | 0,25 | 0,08 | 0,12 | 0,13 | 0,00 |
| | 13/30 = 0,43333 ∼6,5 | 0,98 | 0,19 | 0,28 | 0,18 | 0,11 | 0,15 | 0,03 | 0,13 |
| | 15/30 = 0,5 ∼7,5 | 1,00 | 0,00 | 0,33 | 0,00 | 0,20 | 0,00 | 0,14 | 0,00 |
| II | 1/30 = 0,03333 ∼0,5 | 0,20 | 0,19 | 0,18 | 0,18 | 0,17 | 0,15 | 0,14 | 0,13 |
| | 3/30 = 0,1 ∼1,5 | 0,00 | 0,38 | 0,00 | 0,35 | 0,00 | 0,31 | 0,00 | 0,25 |
| | 5/30 = 0,16667 ∼2,5 | 0,20 | 0,19 | 0,18 | 0,89 | 0,17 | 0,15 | 0,14 | 0,63 |
| | 7/30 = 0,23333 ∼3,5 | 0,00 | 0,00 | 0,00 | 0,71 | 0,00 | 0,00 | 0,00 | 0,50 |
| | 9/30 = 0,3 ∼4,5 | 0,20 | 0,19 | 0,18 | 0,89 | 0,17 | 0,15 | 0,14 | 0,63 |
| | 11/30 = 0,36667 ∼5,5 | 0,00 | 0,38 | 0,00 | 0,35 | 0,00 | 0,31 | 0,00 | 1,25 |
| | 13/30 = 0,43333 ∼6,5 | 0,20 | 0,19 | 0,18 | 0,18 | 0,17 | 0,15 | 0,14 | 1,13 |
| | 15/30 = 0,5 ∼7,5 | 0,00 | 0,00 | 0,00 | 0,00 | 0,00 | 0,00 | 0,00 | 1,00 |

FIG. 12

INVENTORS
CORNELIS H. LOOS &
JOHANNES B.H. PEEK
BY
Frank R. Jifani
AGENT

INVENTORS
CORNELIS H. LOOS &
JOHANNES B. H. PEEK
BY
Frank R. Trifari
AGENT

United States Patent Office 3,396,384

Patented Aug. 6, 1968

3,396,384
CIRCUIT ARRANGEMENT FOR CONVERTING AN ANALOG SIGNAL INTO A PULSE SEQUENCE MODULATED IN NUMBER

Cornelis Henricus Loos and Johannes Bernhard Heinrich Peek, Emmasingel, Eindhoven, Netherlands, assignors to North American Philips Company, Inc., New York, N.Y., a corporation of Delaware Filed Dec. 8, 1964, Ser. No. 416,799
Claims priority, application Netherlands, Dec. 11, 1963, 301,694
6 Claims. (Cl. 340—347)

ABSTRACT OF THE DISCLOSURE

An analog to digital converter converts an analog signal to a digital signal that has a number of equal duration pulses in each of a successive group of equal duration periods, the number of pulses produced in each period being a measure of the average value of the analog signal during the period. The digital signal is produced by adding the analog signal to an auxiliary signal, and applying the sum signal to a threshold circuit. The auxiliary signal is a periodic signal having a plurality of different levels during each period, with successive levels not differing from their respective preceding levels by a constant amount. Preferably successive levels alternate on opposite sides of a given level.

The invention relates to a circuit arrangement for converting an analog signal into a pulse sequence from which the initial analog signal can be reconstructed. A known example of such a conversion is the so-called pulse duration modulation, in which the analog signal is converted into sequence of pulses of which either leading edges or the trailing edges have constant relative distances, the duration of each pulse being proportional to the value of the analog signal at the instant of appearance of the trailing edge or the leading edge of the pulse concerned. The modulation method according to the invention may be considered to consist in that each duration-modulated pulse is replaced by a number of separate pulses proportional to said duration and hence also to the instantaneous value of the analog signal so that a number-modulated pulse sequence may be referred to. As such the novel modulation method shows a certain analogy to frequency modulation and it has a number of advantages in common herewith, but in reality we are concerned here with an essentially different modulation prinicple, which is realised by essentially different technical means. The difference appears inter alia from the fact that with a constant analog signal the pulses of a number-modulated pulse series have in general variable relative distances.

The essence of the novel modulation method and some advantages thereof will be described more fully with reference to the drawing.

Figure 5:
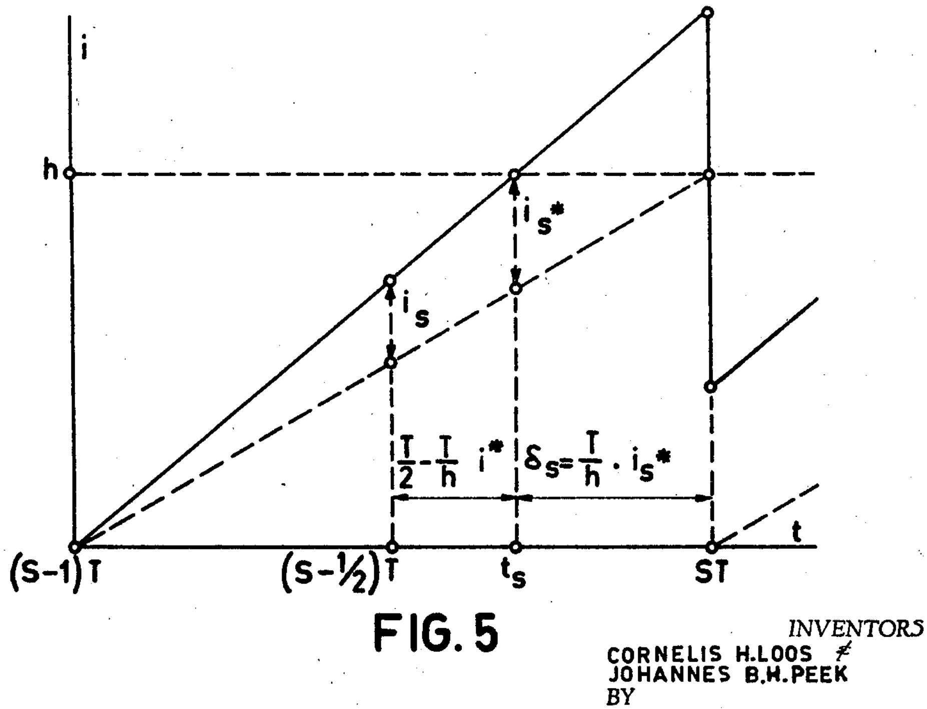

FIG. 5 serves for explaining a kind of distortion associated with this modulation method.

Figures 6, 7, 8:
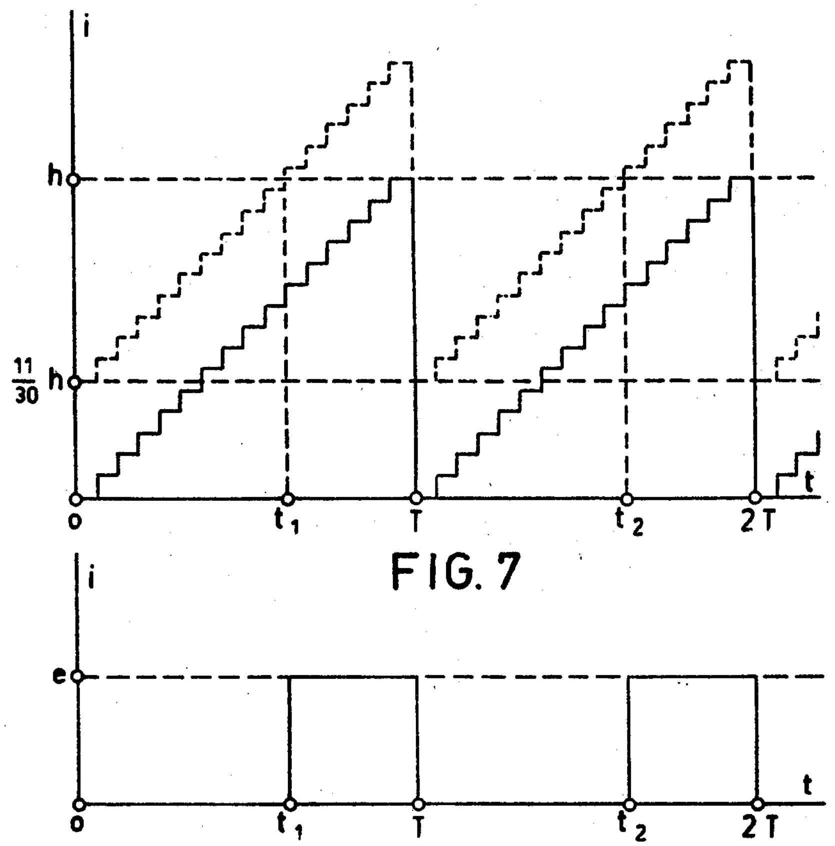

FIG. 6 is a table for explaining another kind of distortion associated with the modulation method.

FIG. 7 illustrates an auxiliary signal formed by a step signal.

FIG. 8 shows the associated pulse-duration-modulated pulse sequence.

Figure 9:
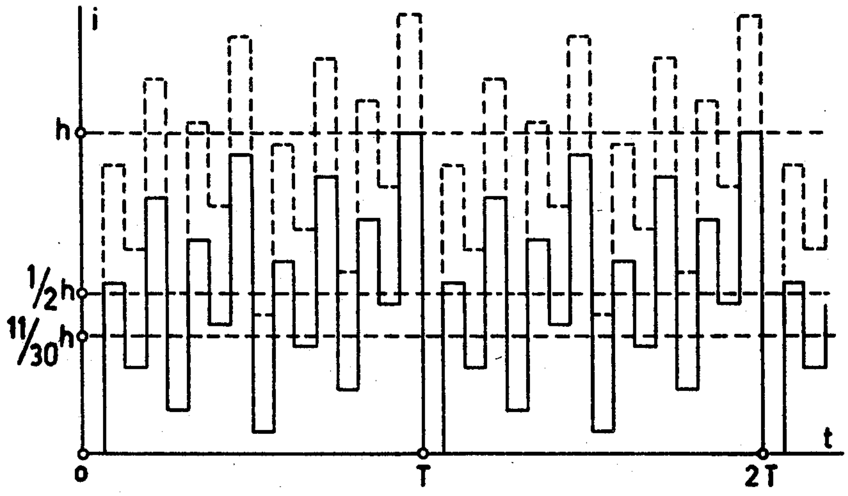

FIG. 9 shows an auxiliary signal suitable for use in the novel modulation method.

Figure 10:
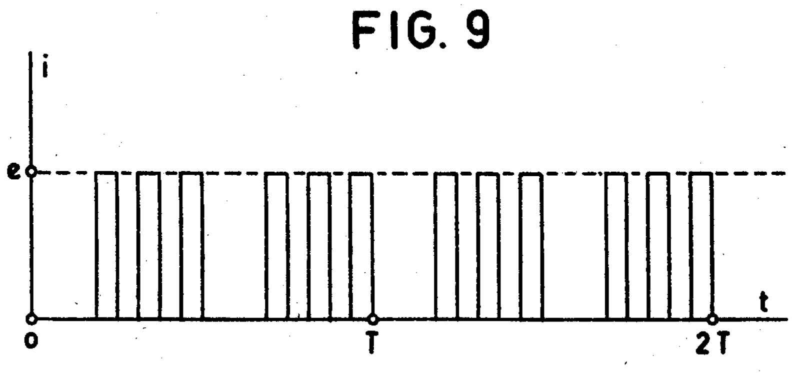

FIG. 10 shows the associated number-modulated pulse sequence.

Figure 11:
Figure 11:

FIGS. 11 and 12 are two tables for comparing some results obtained by the known and by the novel modulation methods.

Figure 13:
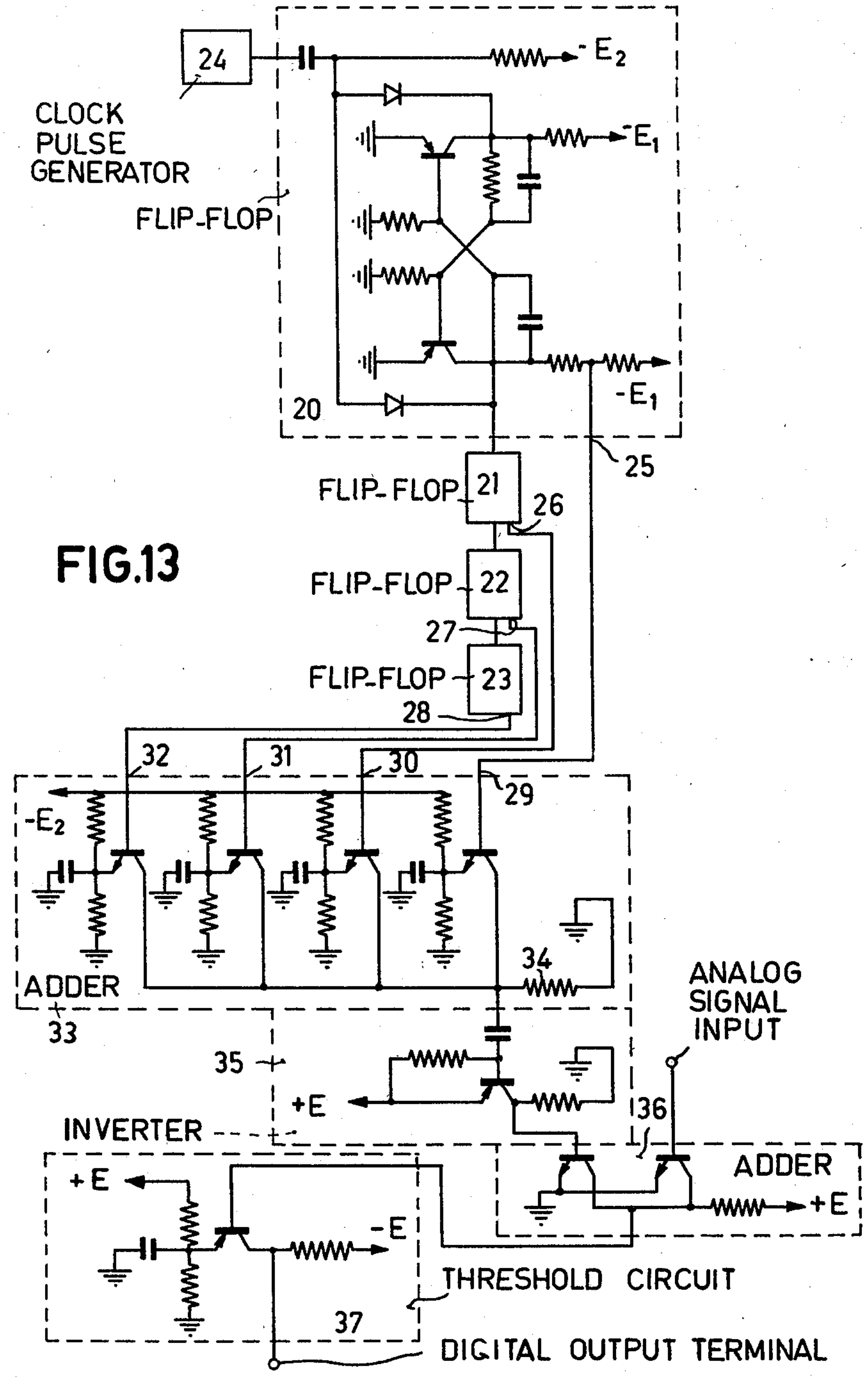

FIG. 13 illustrates a circuit which may be employed to convert an analog signal to a digital signal in accordance with the invention.

Since, as stated above, the novel modulation method according to the invention may be considered as a variant of the so-called pulse-duration modulation, it is useful to give first some ideas of this modulation method with reference to FIGS. 1 to 8.

Figure 1:
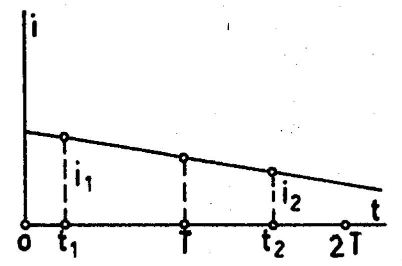
FIG. 1 shows a variable analog signal.
Figure 2:
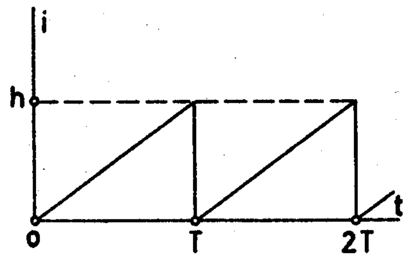
FIG. 2 shows an auxiliary signal suitable for pulse duration modulation.
Figure 3:
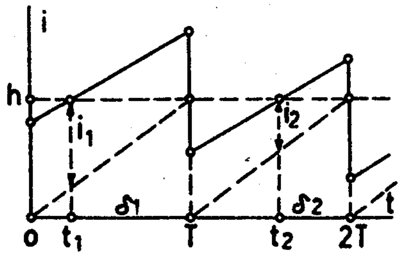
FIG. 3 illustrates the sum of the signals of FIGS. 1 and 2.
Figure 4:
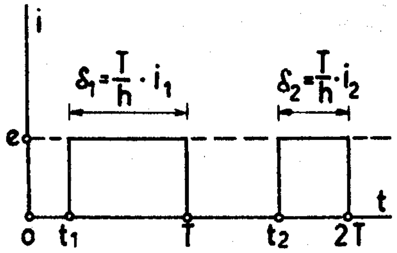
FIG. 4 shows the pulse-duration-modulated pulse sequence associated with the analog signal of FIG. 1.

FIG. 1 illustrates a variable analog signal, hereinafter termed the input signal. FIG. 2 illustrates a so-called sawtooth signal, serving as an auxiliary signal, having a period T (thus a frequency $\omega=2\pi/T$) and an amplitude $h$. FIG 3 shows the signal hereinafter termed the sum signal obtained by adding the input signal and the sawtooth signal. The sum signal is applied to a device termed herein a discriminator, which does not supply current when the value of the incoming sum signal is lower than $h$ and which supplies a current of constant intensity $e$, when the value of the sum signal exceeds $h$. FIG. 4 illustrates the pulse sequence supplied by the discriminator. It appears that the leading edges of the pulses of said sequence occur at the variable instants $t_1, t_2, \ldots$, when the sum signal exceeds the value $h$, whereas the trailing edges of said pulses occur at the constant instants T, 2T, . . . . The duration of the pulse starting at the instant $t_s$ ($s=1, 2, \ldots$), is proportional to the value of the input signal at the instant $t_s$, or in otherwords the pulses furnished by the discriminator are modulated in duration.

The input signal can, at least approximately, be reconstructed from the duration-modulated pulses by applying them to a device termed herein a demodulator, which averages the incoming pulses for the duration of at least one period. The demodulator may be formed by a passive low-pass filter having a cut-off frequency $\omega_0$, wherein $\omega_0$ may at the most be $2\pi/T$. The signal supplied by the demodulator will hereinafter be termed the output signal.

There are a number of causes of the discrepancy between the output signal and the input signal. The difference between the output signal and the input signal is termed the distortion produced by the modulation and the demodulation. A few causes of said distortion will be described more fully.

A first cause of the distortion may be the fact that the instants $t_1, t_2, \ldots$ are not accurately equidistant, since they occupy places in the consecutive periods depending upon the instantaneous value of the input signal. The influence thereof on the output signal will be apparent from FIG. 5. Instead of the value $i_s$ of the input signal at the fixed instant $(s-\frac{1}{2})T$ of the $s$th period, the value $i_s{}^*$ at the variable instant $t_s$ of this period is employed for the reconstruction of the incoming input signal. Neglecting infinitely small magnitudes of the second and higher orders and assuming that $$\frac{T}{h}\frac{di}{dt}$$

($i$=input signal) is infinitely small of the first order, it follows from FIG. 5 that:

$$i_s{}^*=i_s+h\left(\frac{1}{2}-\frac{i^x}{h}\right)\frac{T}{h}\frac{dis}{dt}$$

With this approximation it is thus found that the distortion in conseqeunce of this cause is equal to $$i^x-i=h\left(\frac{1}{2}-\frac{i}{h}\right)\frac{T}{h}\frac{di}{dt}$$

Introducing the relative magnitudes:

$$k=\frac{i}{h},\ \epsilon=\frac{i^x-i}{h}$$

said formula changes into:

$$\epsilon=T\left(\frac{1}{2}-k\right)\frac{dk}{dt}$$

Herein the relative signal strength $k$ is, of course, a magnitude lying in the interval $0\leqq k\leqq 1$.

If the input signal is, for example, sinusoidal and if:

$$k=\tfrac{1}{2}\ (1+\mu\sin\omega t),\ (0\leqq)\mu\leqq$$

we find:

$$\epsilon=-\tfrac{1}{8}\ T\mu^2\omega\sin 2\omega t$$

From this formula it appears that the distortion of a harmonic signal is itself also harmonic and has double the frequency. Hence the components of higher frequencies of an input signal composed of harmonic components are subjected to a greater distortion that the components of lower frequencies and the components having a greater amplitude are subjected to a greater distortion that the components having a lower amplitude. If the demodulator has a cut-off frequency $\omega_0$, the components of a frequency lying between $\tfrac{1}{2}\omega_0$ and $\omega_0$ are not distorted by this cause.

A second source of distortion is the conversion of the input signal into a pulse sequence. Apart from the constant term, the Fourier series of a pulse sequence of the frequency $$\omega=\frac{2\pi}{T}$$

the pulses of which have the amplitude $e$ and the constant duration $k$T, is equal to $$\frac{2e}{\pi}\sum_{n=1}^{\infty}a_n(k)\cdot\cos n\omega t$$

wherein $$a_n(k)=\frac{\sin nk\pi}{n}.$$

The coefficients of the Fourier series are therefore functions of the relative signal value $k$, and $$a_n(1-k)=(-)^{n-1}a_n(k)$$

The table of FIG. 6 shows the absolute values of $a_n(k)$ for $n=1, 2, \ldots 8$, and $k=\tfrac{1}{16}, \tfrac{2}{16}, \ldots \tfrac{8}{16}$.

It appears therefrom that with this method of modulation and demodulation the components of the input signal with the frequencies $2\pi/T$, $4\pi/T$, $6\pi/T$, . . . are mixed with components introduced by the modulation having the same frequencies. Since these latter components depend in a non-linear manner upon the instantaneous strength of the input signal the demodulator is not capable of unravelling said mixtures. For this reason the cut-off frequency $\omega_0$ of the demodulator must lie below $2\pi/T$, as a result of which, however, all harmonic components of the input signal having a frequency of $2\pi/T$ or higher get lost.

The particularly simplified explanation given above varies little when the sawtooth signal of FIG. 2 is replaced by a step signal of FIG. 7 besides that then a new source of distortion is introduced, producing the so-called quantisation noise. This latter phenomenon will not be described further here. FIG. 7 shows, moreover, in a broken line, the sum signal for the case in which the input signal has the constant relative value $k=\tfrac{11}{30}=0.36667$. FIG. 8 shows the pulse sequence furnished by the discriminator at this value of the input signal.

The invention is based on the recognition of the fact that the possibility of modulating and demodulating is not lost when the steps of the step signal are permuted in some way or other, for example so that the auxiliary signal shown in full line in FIG. 9 is obtained. It will be shown that the permutation may be chosen so that the system has certain advantages over the system in which a sawtooth signal or a step signal is employed as an auxiliary signal.

FIG. 9 shows in a broken line the sum signal for the case in which the input signal has the constant relative value $k=\tfrac{11}{30}=0.3667$. FIG. 10 shows the pulse sequence furnished by the discriminator in this case. The difference between the pulse sequences of FIGS. 8 and 10 is found to consist in that each pulse of the signal of FIG. 8 is replaced by a number of shorter pulses (six in FIG. 10) having together the same duration as the relevant single pulse of the signal of FIG. 8. By averaging over each period, in both cases exactly the same output signal is obtained, which confirms that the signal of FIG. 9 can, indeed, be employed as an auxiliary signal.

Signals of the waveform shown in FIGS. 7 and 9 can be produced technically in a very simple manner, if these signals have $2^p$ different levels. In FIGS. 7 and 9 $p=4$ (sixteen levels). In this case the auxiliary signal can be built up from so-called Rademacher signals having periods T, $T/2$, $T/4$, $T/8$, . . . and amplitudes $\delta$, $2\delta$, $4\delta$, $8\delta$, . . . The Rademacher signals can be produced in known manner by means of possibly transistorized Eccles-Jordan circuits. The step signal of FIG. 7 can be produced for example by means of four Eccles-Jordan circuits with amplitudes $\delta$, $2\delta$, $4\delta$, and $8\delta$ and frequencies $16\pi/T$, $8\pi/T$, $4\pi/T$ and $2\pi/T$ (i.e. with periods ⅛T, ¼T, ½T, T). The signal of FIG. 9 can be produced by means of four Eccles-Jordan circuits with amplitudes $8\delta$, $4\delta$, $2\delta$ and $\delta$ and with the frequencies: $16\pi/T$, $8\pi/T$, $4\pi/T$, $2\pi/T$ (i.e. with the periods ⅛T, ¼T, ½T, T). This is illustrated in the upper part of the table of FIG. 11.

The lower part of the table of FIG. 11 indicates the value of the signal furnished by the discriminator for $k=\tfrac{1}{30}, \tfrac{3}{30}, \tfrac{5}{30}, \tfrac{7}{30}, \tfrac{9}{30}, \tfrac{11}{30}, \tfrac{13}{30}$ and $\tfrac{15}{30}$. If the various levels of the auxiliary signal are indicated by 0, 1, 2, . . . 15, said values of $k$ correspond to the levels: 0.5, 1.5, 2.5, 3.5, 4.5, 5.5, 6.5, 7.5. The line for the case $k=\tfrac{9}{30}=0.3$ (level 4.5) is found as follows. The sum signal is found by adding the value 4.5 to the values 0, 1, 2, . . . 15 of the auxiliary signal. The signal supplied by the discriminator has the value 0, when the sum signal lies below the level 15, that is to say during the time intervals in which the auxiliary signal has one of the levels 0, 1, 2, . . . 10, while the signal supplied by the discriminator has the value 1 when the sum signal lies above the level 15, that is to say during the time intervals when the auxiliary signal has one of the levels 11, 12, 13, 14 and 15. In this way all further lines of the table of FIG. 11 can be determined.

An example of a circuit that may be employed to convert an analog signal into a digital signal in accordance with the invention is illustrated in FIG. 13. In this circuit, four flip-flop circuits 20, 21, 22 and 23 are cascade connected in that order, and a clock pulse generator 24 is connected to the input of the first flip-flop circuit 20. The flip-flop circuit may be of any conventional type, such as the transistor flip-flop shown for the circuit 20. Since the amplitude of the outputs of the flip-flop circuits must have a ratio of 8:4:2:1 in accordance with the arrangement described with reference to FIG. 11, voltage dividers are provided in the collector circuits of the output transistors so that the signals at the output terminals 25, 26, 27 and 28 have this ratio. The flip-flop circuits 21, 22 and 23 may of course have the same circuit as that shown for the flip-flop circuit 20. When the clock pulse generator 24 has a period equal to $\tfrac{1}{16}T$, the outputs of the flip-flop circuits will have amplitudes and occur in the sequence according to the upper right-hand table of FIG. 11.

The output terminals 25, 26, 27 and 28 are connected to separate input terminals 29, 30, 31 and 32 respectively of an adder circuit 33. The adder circuit 33 may be of any conventional type. For example, as shown in the figure, it may comprise a plurality of transistors having a common collector resistor 34, with the input terminals being connected to the bases of separate transistors. The emitters of the transistors may be biased at or near cut off. In order to obtain a signal of the form shown in solid lines in FIG. 9, the output of adder 33 across collector resistor 34 is applied to an inverter 35.

The output of the inverter 35, and the analog signal input are applied to an adder 36, which may, for example, be of the same type as the adder 33. The output of the adder 36 will be of the form, for example, as shown by the dashed curve in FIG. 9, when the analog value of $K=0.36667$. The output of the adder 36 is applied to a threshold circuit 37 to provide an output signal of the form shown in FIG. 10.

The table of FIG. 12 provides a survey of the harmonic components introduced by the modulation with the periods T, ½T, ⅓T, . . . ⅛T for the case in which the step signal of FIG. 7 is employed as an auxiliary signal (upper part of the table, case I), and for the case in which the signal of FIG. 9 is employed as an auxiliary signal (lower part of the table, case II). The values of the amplitudes in the case I can be read directly from the table of FIG. 6. The values indicated for the case II are calculated as follows. By way of example we consider the line for $k=11/30=0.36667$, corresponding to the level 5.5. From the table of FIG. 11 it appears that the discriminator supplies in this case a signal which may be represented by:

0001010100010101

This signal may be considered to form the superimposition of the two signals:

+0101010101010101 and

−0100000001000000.

The first signal is a signal of the period ⅛T for which $k=0.5$, so that for this signal:

$$a_1=0\ a_2=0\ a_3=0\ a_4=0\ a_5=0\ a_6=0\ a_7=0\ a_8=1.00$$

Apart from the sign and the phase, the second signal is a signal of the period ½T, for which $k=1/8=0.125$, so that for this signal:

$$a_1=0\ a_2=0.38\ a_3=0\ a_4=0.35\ a_5=0\ a_6=0.31\ a_7=0\ a_8=0.25$$

By addition it follows therefrom:

$$a_1=0\ a_2=0.38\ a_3=0\ a_4=0.35\ a_5=0\ a_6=0.31\ a_7=0\ a_8=1.25$$

These are exactly the values found in the table of FIG. 12 for the case II on the line $k=11/30=0.36667$ (level 5.5). However, it should be noted that the values of the table of FIG. 12 for $k=0.16667$ (level 2.5), $k=0.30000$ (level 4.5), $k=0.36667$ (level 5.5) and $k=0.43333$ (level 6.5) are at any rate greater and hence more unfavourable than the real values, since the calculation is carried out for the most unfavourable case, i.e. the case in which the two harmonic components building up the relevant harmonic component itself are exactly co-phased and therefore amplify each other to the maximum. Nevertheless, it appears from the table of FIG. 12 that the harmonics introduced by the modulation have a smaller amplitude in the case II than in the case I, with the exception of $k=0.03333$ (level 0.5) and hence also for $k=0.96667$ (level 14.5), which advantage is particularly conspicuous for input signal for which $k$ lies in the proximity of 0.5. It follows therefrom that when using the same frequencies of the Eccles-Jordan circuits producing the auxiliary signal and when the same relative distortion is allowed, higher frequencies can be transmitted in the input signal, when the modulation is carried out with the aid of the auxiliary signal shown in FIG. 9, than in the case in which the modulation is performed by means of the auxiliary signal shown in FIG. 7. This is due to the fact that the modulated signal in the first case (FIG. 10), but for extreme values of the input signal ($k\sim0$ and $k\sim1$), is built up predominantly from short pulses of periods shorter than T. This, in its turn, is due to the fact that the successive values of the auxiliary signal of FIG. 9 are lying alternately below and above the signal value ½$h$. It is therefore advantageous to choose the auxiliary signal so that the consecutive values thereof are lying as far as possible alternately below and above the value of the input signal which is statistically most frequent.

Finally it should be noted that the distortion by the cause described with reference to FIG. 5 is smaller in the new method than in the known method, which may be accounted for by the fact that the pulses of the number-modulated pulse sequence are distributed more or less uniformly in the time interval of a period T. For a similar reason the advantages of the novel method are greater when the auxiliary signal has more levels, and hence when $p$ is greater.

The advantages of the novel modulation method explained above in a simplified form are completely confirmed by experiments.

With respect to the technological realisation of the novel modulation method described it should be noted that it differs from a circuit arrangement for pulse-duration modulation with a step curve as an auxiliary signal only in that the flipflops in the generator of the auxiliary signal are differently interconnected, a difference which is so small that the known system can be converted into the new system solely by a modification of the relative connections of said flipflops.

What is claimed is:

1. A circuit for converting an analog signal to a digital signal comprising a source of said signals, a source of an auxiliary periodic signal having $n$ equal duration different amplitude levels during each period wherein at least three successive levels during each period differ from their respective preceding levels by different amounts, means for adding said analog and auxiliary signals, a threshold circuit means having a given threshold level, and means applying said added signals to said threshold circuit means, whereby the output of said threshold circuit means has a first level when said added signals exceed said threshold level and a second level when said added signals are less then said threshold level.

2. A circuit for converting an analog signal to a digital signal comprising a source of said signal, a source of an auxiliary periodic signal having a plurality of different amplitude levels of equal duration during each period of duration T whereby successive amplitude levels are alternately greater and less than a given amplitude level, means for adding said analog and auxiliary signals, a threshold circuit means having a given threshold level, and means applying said added signals to said threshold circuit means, whereby the output of said threshold circuit means has a first level when said added signals exceed said threshold level and a second level when said added signals are less than said threshold level.

3. The circuit of claim 2 wherein said source of an auxiliary periodic signal comprises a source of a plurality of periodic bivalent signals having periods of T, T/2, T/4, T/8 . . . T/$n$, and relative amplitudes of 1, 2, 4, 8 . . . $n$ respectively, wherein $n$ is an integer, and means for adding said bivalent signals to produce said auxiliary signal.

4. The circuit of claim 3 in which said bivalent signals are Rademacher signals.

5. The circuit of claim 3 in which said source of a plurality of bivalent periodic signals comprises a plurality of cascade connected flip-flop circuits, and means for deriving each said bivalent signal from a separate flip-flop circuit.

6. In a circuit for converting an analog signal to a digital signal of the type comprising a source of said analog signal, a source of a periodic signal of period T, a threshold circuit, means applying the sum of said analog and periodic signal to said threshold circuit, and means connected to the output of said threshold circuit for producing a bivalent output signal having a first level when said sum exceeds a given threshold level and a second level when said sum is less than said threshold level, the improvement wherein said source of a periodic signal comprises a source of a signal having *n* predetermined different values of equal time durations during each period T, wherein *n* is an integer, and wherein the amplitude of said last mentioned signals varies alternately in opposite senses between at least three successive said levels, whereby said digital signal is in the form of a number of equal duration pulses during each period T that is a function of the average value of said analog signal during said period.

References Cited

UNITED STATES PATENTS

| | | | |
|---|---|---|---|
| 2,560,434 | 7/1951 | Gloess et al. | 340—347 |
| 3,042,911 | 7/1962 | Paradise et al. | 340—347 |
| 3,303,493 | 2/1967 | Charbonnier | 340—347 |
| 3,281,828 | 10/1966 | Kaneko | 340—347 |
| 3,305,856 | 2/1967 | Jenkison | 340—347 |
| 3,316,547 | 4/1967 | Ammann | 340—347 |

MAYNARD R. WILBUR, *Primary Examiner.*

W. J. KOPACZ, *Assistant Examiner.*